(12) United States Patent
Nishida et al.

(10) Patent No.: US 7,862,461 B2
(45) Date of Patent: Jan. 4, 2011

(54) AUTOMATIC TRANSMISSION

(75) Inventors: Masaaki Nishida, Anjo (JP); Hiroshi Katou, Anjo (JP); Masashi Kitou, Anjo (JP); Kohei Iizuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 348 days.

(21) Appl. No.: 12/071,567

(22) Filed: Feb. 22, 2008

(65) Prior Publication Data

US 2009/0011892 A1 Jan. 8, 2009

(30) Foreign Application Priority Data

| Jul. 5, 2007 | (JP) | ............................. 2007-177824 |
| Jul. 5, 2007 | (JP) | ............................. 2007-177825 |
| Jul. 24, 2007 | (JP) | ............................. 2007-192690 |

(51) Int. Cl.
 *F16H 31/00* (2006.01)
 *F16D 47/04* (2006.01)
(52) U.S. Cl. .................................. 475/146; 192/48.619
(58) Field of Classification Search ................. 475/275, 475/146
 See application file for complete search history.

(56) References Cited

U.S. PATENT DOCUMENTS

| 4,732,253 A | * | 3/1988 | Hiramatsu et al. ...... 192/48.618 |
| 5,887,690 A | * | 3/1999 | Haupt .................... 192/48.611 |
| 6,454,074 B1 | * | 9/2002 | Kundermann et al. .. 192/48.618 |
| 7,001,298 B2 | * | 2/2006 | Biermann et al. ........... 475/116 |
| 7,416,069 B2 | * | 8/2008 | Tiesler ................... 192/48.611 |
| 2007/0060438 A1 | | 3/2007 | Fukuyama et al. |
| 2007/0184932 A1 | | 8/2007 | Tabata et al. |
| 2008/0202884 A1 | * | 8/2008 | Nishida et al. ........... 192/106 F |
| 2008/0207384 A1 | * | 8/2008 | Nishida et al. .............. 475/276 |
| 2008/0207386 A1 | * | 8/2008 | Nishida et al. .............. 475/276 |
| 2008/0220928 A1 | * | 9/2008 | Nishida et al. .............. 475/275 |
| 2009/0017954 A1 | * | 1/2009 | Nishida et al. .............. 475/159 |
| 2009/0029820 A1 | * | 1/2009 | Nishida et al. .............. 475/159 |

FOREIGN PATENT DOCUMENTS

| JP | A-07-269665 | 10/1995 |
| JP | A-2001-50301 | 2/2001 |
| JP | A-2006-342845 | 12/2006 |
| JP | A-2007-032624 | 2/2007 |
| WO | WO 2005/026579 A1 | 3/2005 |

* cited by examiner

*Primary Examiner*—Dirk Wright
(74) *Attorney, Agent, or Firm*—Oliff & Berridge, PLC

(57) ABSTRACT

An automatic transmission that includes one clutch that includes a clutch drum; a piston that forms a hydraulic oil chamber using a part of the clutch drum as a cylinder; a plurality of friction plates that engage with the clutch drum; and a cancel oil chamber that is provided on a rear side of the piston and that cancels a centrifugal oil pressure that acts on the hydraulic oil chamber. Oil is supplied to the cancel oil chamber from a boss portion formed in the clutch drum on a radially inner side, and the oil is discharged from discharge holes formed in the boss portion to an outside of a hydraulic oil chamber side of the clutch drum.

10 Claims, 6 Drawing Sheets

FIG.2

| | C1 | C2 | C3 | C4 | B1 | B2 | F1 |
|---|---|---|---|---|---|---|---|
| 1st | ● | | | | | (●) | ● |
| 2nd | ● | | | | ● | | |
| 3rd | ● | | ● | | | | |
| 4th | ● | | | ● | | | |
| 5th | ● | ● | | | | | |
| 6th | | ● | | ● | | | |
| 7th | | ● | ● | | | | |
| 8th | | ● | | | ● | | |
| Rev1 | | | ● | | | ● | |
| Rev2 | | | | ● | | ● | |

(●) DENOTES BEING CARRIED OUT DURING ENGINE BRAKING

AUTOMATIC TRANSMISSION

INCORPORATION BY REFERENCE

The disclosure of Japanese Patent Application No. 2007-192690 filed on Jul. 24, 2007, Japanese Patent Application No. 2007-177825 filed on Jul. 5, 2007, and Japanese Patent Application No. 2007-177824 filed on Jul. 5, 2007 including the specifications, drawings and abstracts are incorporated herein by reference in their entirety.

BACKGROUND

The present invention relates to an automatic transmission.

Recently, an automatic transmission (multi-speed automatic transmission) that is installed in a vehicle is required to have a plurality of speeds, such as eight forward speeds, for example. In order to facilitate easy installation to a vehicle, there is a demand for a layout in which many components, e.g., clutches, are arranged in a compact manner.

There exists an automatic transmission that includes two clutches in which either the input or output member is provided as a common member, and the other is provided as a separate member. The clutches are arranged at different positions with respect to the radial direction such that they overlap in the axial direction, thereby achieving a compact automatic transmission, particularly achieving downsizing in the axial direction (see, for example, Japanese Unexamined Patent Application Publication No. 7-269665). The aforementioned two clutches include multi-plate friction members, hydraulic oil chambers that operate the friction plates, and cancel oil chambers that cancel the centrifugal oil pressure of thehydraulic oil chambers, such that they overlap in the axial direction.

The aforementioned two hydraulic oil chambers and cancel oil chambers are arranged in a clutch drum provided as a single unit with a turbine shaft. An oil passage is formed on a boss portion of the clutch drum, and oil pressure is supplied to the two hydraulic oil chambers via the oil passage. Furthermore, of the two cancel oil chambers, the cancel oil chamber provided on the radially inner side is structured such that the oil is directly supplied via an oil hole formed in the boss portion of the clutch drum. On the other hand, the cancel oil chamber provided on the radially outer side is structured such that the oil in the cancel oil chamber on the radially inner side is supplied via an oil passage provided to the piston of the clutch on the radially inner side and via an oil passage formed in the clutch drum on the radially inner side which is a fixed member.

This arrangement allows the cancel oil chamber provided on the radially outer side to operate so as to sufficiently balance the centrifugal oil pressure that occurs in the hydraulic oil chamber provided on the radially outer side, by setting the base point of the centrifugal oil pressure further on an inner side than the radially inner side of the cancel oil chamber provided on the radially inner side. Furthermore, in order to prevent oil leakage from the radially inner side of a cancel plate (partition wall) of the cancel oil chamber on the radially outer side, an O-ring is provided on the outer peripheral surface of the clutch drum on the radially inner side that supports the cancel plate.

SUMMARY

The aforementioned two clutches require a complicated oil passage structure for supplying the oil pressure (or oil) to the hydraulic oil chambers and the cancel oil chambers. In particular, the oil is supplied to the cancel oil chamber provided on the radially outer side via a complicated oil passage. When the oil pressure is removed from the hydraulic oil chamber in order to disengage the clutch on the radially outer side, in some cases, such an arrangement has difficulty in rapidly supplying the oil to the cancel oil chamber on the radially outer side, leading to difficulty in providing appropriate clutch timing.

Also, when the oil is discharged from the cancel oil chamber based on the supply of the oil pressure to thehydraulic oil chamber, the oil is discharged via the oil (lubricating oil) supply passage in the reverse direction. Such an arrangement exhibits poor discharge efficiency, and, in some cases, leads to difficulty in providing appropriate clutch timing.

Also, the arrangement disclosed in Japanese Unexamined Patent Application Publication No. 7-269665 allows the hydraulic oil chambers and the cancel oil chambers to be arranged at different positions with respect to the radial direction, using the complicated oil passage structure; in particular, the oil supply structure for supplying oil to the cancel oil chamber of the clutch on the radially outer side. As a result, these cancel oil chambers are arranged independent of each other, and no other components are disposed adjacent to the cancel plate of each cancel oil chamber (i.e., there is a vacant space on the outside of the cancel plate in the axial direction). This means that this vacant space is not effectively used, i.e., there is still room for effective use of the space in the multi-stage transmission. In this case, a discharge hole cannot be provided to the cancel plate, unlike ordinary designs. Accordingly, the oil is discharged via the aforementioned oil supply passage to the cancel oil chamber in the reverse direction. In some cases, such an arrangement has difficulty in providing appropriate clutch timing.

The oil passage to the cancel oil chamber is formed on the radially outer side. Accordingly, there is a need to provide an O-ring to the piston on the radially inner side in order to form the aforementioned oil passage to the cancel oil chamber provided on the radially outer side, in addition to the O-ring for thehydraulic oil chamber. Furthermore, as described above, an O-ring is required to prevent leakage of the oil from the cancel oil chamber provided on the radially outer side. This leads to a further difficulty in improving its compactness in the axial direction.

In the case of a generally employed structure for supplying the oil from the oil hole provided in a sleeve to the cancel oil chamber, the oil is discharged via a discharge hole or a discharge groove provided in the cancel plate. However, with this structure, the base point of the centrifugal oil pressure of the oil in the cancel oil chamber is set to the centrifugal oil pressure at the discharge hole or the discharge groove. In some cases, a problem may occur in which the cancel oil pressure in the cancel oil chamber becomes insufficient, leading to difficulty in removing the centrifugal oil pressure that acts on thehydraulic oil chamber. In particular, when two clutches are arranged at different positions with respect to the radial direction such that they overlap in the axial direction, there is often difficulty in securing sufficient cancel oil pressure in the cancel oil chamber of the clutch provided on the radially outer side.

The present invention thus provides an automatic transmission including a cancel oil chamber having a suitably set discharge hole, thereby solving the aforementioned problems. The present invention is also able to achieve other advantages.

According to an exemplary aspect of the invention, an automatic transmission includes one clutch that includes a clutch drum; a piston that forms a hydraulic oil chamber using a part of the clutch drum as a cylinder; a plurality of friction plates that engage with the clutch drum; and a cancel oil chamber that is provided on a rear side of the piston and that cancels a centrifugal oil pressure that acts on the hydraulic oil chamber. Oil is supplied to the cancel oil chamber from a boss portion formed in the clutch drum on a radially inner side, and the oil is discharged from discharge holes formed in the boss portion to an outside of a hydraulic servo side of the clutch drum.

BRIEF DESCRIPTION OF THE DRAWINGS

Various exemplary aspects will be described with reference to the drawings, wherein:

FIG. 2 is an engagement table of the automatic transmission according to the present invention;

DETAILED DESCRIPTION OF EMBODIMENTS

Figure 1:
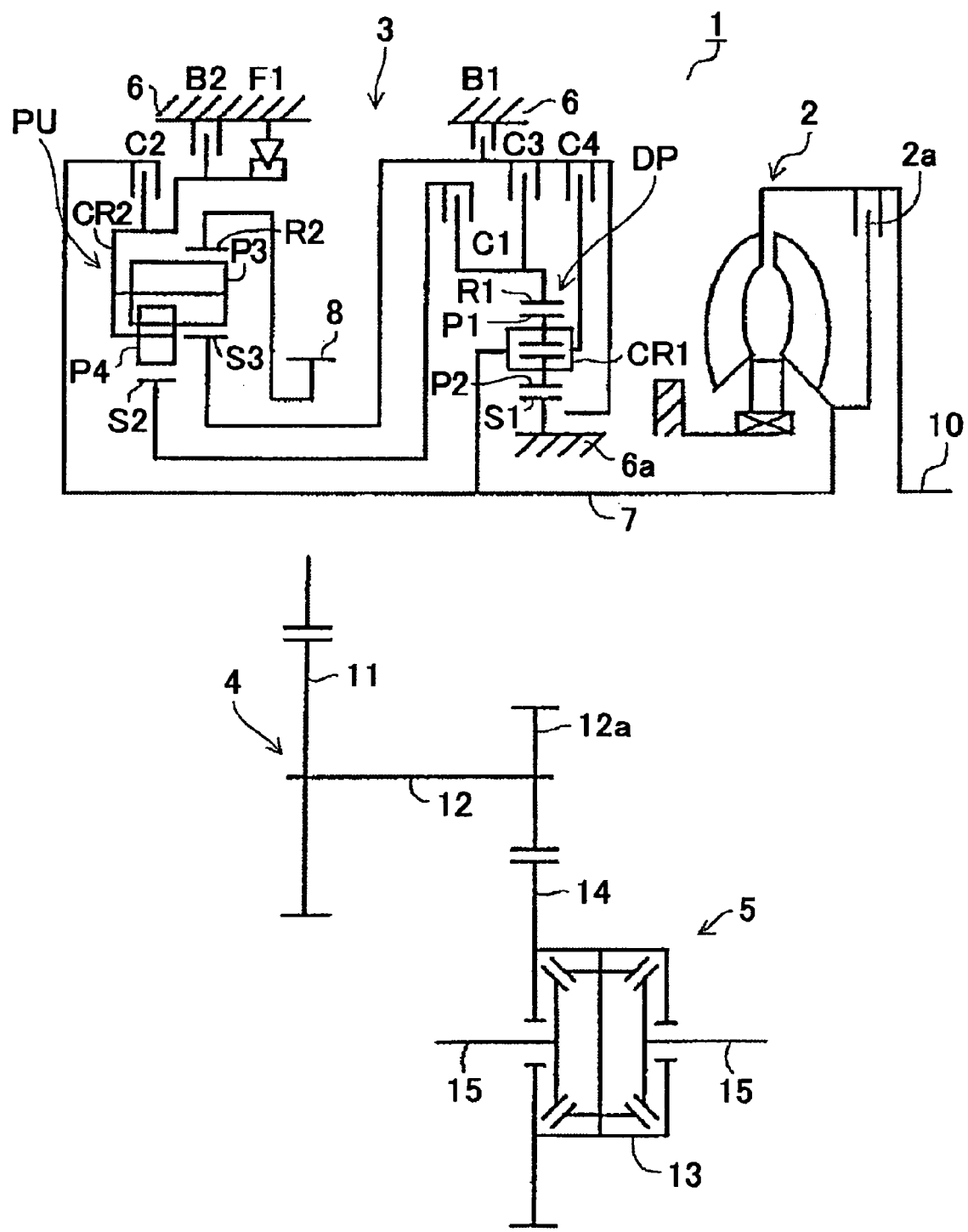
FIG. 1 is a skeleton diagram that schematically shows an automatic transmission according to the present invention.

Hereinafter, an embodiment of the present invention will be described with reference to FIG. 1 through FIG. 5.

The present invention relates to an automatic transmission suitable for application in a vehicle such as an FF (front engine/front drive) type vehicle etc. The left-right direction in FIGS. 1, 3, 4, and 5 corresponds to the front-rear direction of a power transmission path (a driving source side and a wheel side are referred to as a front side and a rear side, respectively). For convenience of description, the right side in the drawings, i.e., the side of the driving source such as an engine will be referred to as the "front side" hereinafter. On the other hand, the left side in the drawings will be referred to as the "rear side."

First, the schematic configuration of an automatic transmission 1 according to the present invention will be described with reference to FIG. 1. As shown in FIG. 1, the FF-type automatic transmission 1 includes a case 6 such as a housing case and a transmission case, and an input member (front cover and center piece) 10 on the front side of the case (specifically, the converter housing) 6, which allows the automatic transmission 1 to be connected to an engine (not shown). Further, the automatic transmission 1 includes a torque converter 2 having a lock-up clutch 2a. A change gear mechanism 3, a counter shaft unit 4, and a differential unit 5 are disposed in the case 6.

The torque converter 2 is disposed on an axis centered on an input shaft 7 of the change gear mechanism 3 that is disposed coaxially with the output shaft of the engine (not shown). The counter shaft unit 4 is provided on a counter shaft 12 that is in parallel with the input shaft 7. The differential unit 5 having left and right axles 15, 15 is disposed on an axis that is in parallel with the counter shaft 12.

The change gear mechanism 3 includes a planetary gear (reduction planetary gear) DP on the input shaft 7, and a planetary gear unit (planetary gear set) PU on the rear side thereof.

The aforementioned planetary gear DP is a so-called double pinion planetary gear, and includes a first sun gear S1, a first carrier CR1, and a first ring gear R1. The first carrier CR1 includes a pinion P2 that meshes with the first sun gear S1, and a pinion P1 that meshes with the first ring gear R1 such that the pinions P2 and P1 mesh with each other.

The planetary gear unit PU is a so-called Ravigneaux type planetary gear, and includes four rotational elements, i.e., a second sun gear S2, a third sun gear S3, a second carrier CR2, and a second ring gear R2. The second carrier CR2 includes a long pinion P3 that meshes with the third sun gear S3 and the second ring gear R2, and a short pinion P4 that meshes with the second sun gear S2 such that the long pinion P3 and the short pinion P4 mesh with each other.

The first sun gear S1 of the planetary gear DP is fixed to the case 6 such that it cannot rotate with respect to the case 6. The carrier CR1 is connected to the input shaft 7, and provides the same rotation as that of the input shaft 7 (hereinafter referred to as "input rotation"). In addition, the carrier CR1 is connected to a fourth clutch C4. The first ring gear R1 provides a reduced rotation that is obtained by reducing the speed of the input rotation by the fixed first sun gear S1 and the first carrier CR1 that rotates at the input rotation. In addition, the first ring gear R1 is connected to a first clutch C1 and a third clutch C3.

The third sun gear S3 of the planetary gear unit PU is connected to a first brake B1, thereby enabling the third sun gear S3 to be fixed to the case 6. Further, the third sun gear S3 is connected to the fourth clutch C4 and the third clutch C3. Such an arrangement allows the third sun gear S3 to receive the input rotation of the first carrier CR1 via the fourth clutch C4, and the reduced rotation of the first ring gear R1 via the third clutch C3. On the other hand, the second sun gear S2 is connected to the first clutch C1, which allows the second sun gear S2 to receive the reduced rotation of the first ring gear R1.

The second carrier CR2 is connected to a second clutch C2 to which the rotation of the input shaft 7 is input. Such an arrangement allows the second carrier CR2 to receive the input rotation via the second clutch C2. Moreover, the second carrier CR2 is connected to a one-way clutch F1 and a second brake B2. Such an arrangement prevents the second carrier CR2 from rotating only in one direction with respect to the case (specifically, the transmission case) 6 via the one-way clutch F1, and allows the rotation of the second carrier CR2 to be stopped by the second brake B2. The second ring gear R2 is connected to a counter gear 8 rotatably supported by a center support member fixed to the case 6.

The counter gear 8 meshes with a large-diameter gear 11 fixed to the counter shaft 12 of the counter shaft unit 4. The counter shaft 12 meshes with a gear 14 of the differential unit 5 via a small-diameter gear 12a that is formed on the outer peripheral surface of the counter shaft 12. The gear 14 is fixed to a differential gear 13, and is connected to the left and right axles 15, 15 via the differential gear 13.

Next, the operation of the change gear mechanism 3 structured as described above will be described with reference to FIG. 1 and FIG. 2.

For example, when the first forward speed (1st) is selected in the D (drive) range, the first clutch C1 and the one-way clutch F1 are engaged as shown in FIG. 2. In this case, the reduced rotation of the first ring gear R1, which has been reduced by the fixed first sun gear S1 and the first carrier CR1 rotating at the input rotation, is input to the second sun gear S2 via the first clutch C1. Further, the rotation of the second carrier CR2 is restricted to unidirectional rotation (forward rotation direction). That is, the second carrier CR2 is prevented from rotating in the reverse direction, and thus fixed. In this case, the reduced rotation input to the second sun gear S2 is output to the second ring gear R2 via the fixed second carrier CR2, and the forward rotation as the first forward speed is output via the counter gear 8.

It should be noted that, in an engine brake state (coasting state), the second brake B2 is engaged to fix the second carrier CR2. In this state, the first forward speed state is maintained while the forward rotation of the second carrier CR2 is prevented. In the first forward speed state, the one-way clutch F1 permits the forward rotation of the second carrier CR2 while preventing the reverse rotation thereof. Therefore, after the range is switched from the non-drive range to the drive range, for example, the first forward speed can be obtained smoothly by the automatic engagement of the one-way clutch F1.

When the second forward speed (2nd) is selected, the first clutch C1 is engaged, and the first brake B1 is engaged. In this case, the reduced rotation of the first ring gear R1, which has been reduced by the fixed first sun gear S1 and the first carrier CR1 rotating at the input rotation, is input to the second sun gear S2 via the first clutch C1. Further, the engagement of the first brake B1 stops the rotation of the third sun gear S3. In this case, the second carrier CR2 rotates at a reduced rotation lower than that of the second sun gear S2, and the reduced rotation input to the second sun gear S2 is output to the second ring gear R2 via the second carrier CR2. As a result, the forward rotation as the second forward speed is output via the counter gear 8.

When the third forward speed (3rd) is selected, the first clutch C1 and the third clutch C3 are engaged. In this case, the reduced rotation of the first ring gear R1, which has been reduced by the fixed first sun gear S1 and the first carrier CR1 rotating at the input rotation, is input to the second sun gear S2 via the first clutch C1. Further, the reduced rotation of the first ring gear R1 is input to the third sun gear S3 by the engagement of the third clutch C3. That is, the reduced rotation of the first ring gear R1 is input to the third sun gear S3 and the second sun gear S2, and therefore the planetary gear unit PU is in a direct connection state of the reduced rotation. In this state, the reduced rotation is output to the second ring gear R2 without change, and the forward rotation as the third forward speed is output via the counter gear 8.

When the fourth forward speed (4th) is selected, the first clutch C1 and the fourth clutch C4 are engaged. In this case, the reduced rotation of the first ring gear R1, which has been reduced by the fixed first sun gear S1 and the first carrier CR1 rotating at the input rotation, is input to the second sun gear S2 via the first clutch C1. Further, the input rotation of the first carrier CR1 is input to the third sun gear S3 by the engagement of the fourth clutch C4. In this case, the second carrier CR2 rotates at a reduced rotation higher than that of the second sun gear S2. As a result, the reduced rotation input to the second sun gear S2 is output to the second ring gear R2 via the second carrier CR2, and a forward rotation as the fourth forward speed is output via the counter gear 8.

When the fifth forward speed (5th) is selected, the first clutch C1 and the second clutch C2 are engaged. In this case, the reduced rotation of the first ring gear R1, which has been reduced by the fixed first sun gear S1 and the first carrier CR1 rotating at the input rotation, is input to the second sun gear S2 via the first clutch C1. Further, the input rotation is input to the second carrier CR2 by the engagement of the second clutch C2. As a result of the reduced rotation that is input to the second sun gear S2 and the input rotation that is input to the second carrier CR2, a reduced rotation that is higher than that of the aforementioned fourth forward speed is output to the second ring gear R2. As a result, the forward rotation is output via the counter gear 8 as the fifth forward speed.

When the sixth forward speed (6th) is selected, the second clutch C2 and the fourth clutch C4 are engaged. In this case, the input rotation of the first carrier CR1 is input to the third sun gear S3 by the engagement of the fourth clutch C4. Further, the input rotation is input to the second carrier CR2 by the engagement of the second clutch C2. That is, the input rotation is input to both the third sun gear S3 and the second carrier CR2, and therefore the planetary gear unit PU becomes in a direct connection state of the input rotation. In this state, the input rotation is output to the second ring gear R2 without change, and the forward rotation as the sixth forward speed is output via the counter gear 8.

When the seventh forward speed (7th) is selected, the second clutch C2 and the third clutch C3 are engaged. In this case, the reduced rotation of the first ring gear R1, which has been reduced by the fixed first sun gear S1 and the first carrier CR1 rotating at the input rotation, is input to the third sun gear S3 via the third clutch C3. Further, the input rotation is input to the second carrier CR2 by the engagement of the second clutch C2. As a result of the reduced rotation input to the third sun gear S3 and the input rotation input to the second carrier CR2, a reduced rotation that is slightly higher than the input rotation is output to the ring gear R2, and the forward rotation as the seventh forward speed is output via the counter gear 8.

When the eighth forward speed (8th) is selected, the second clutch C2 is engaged, and the first brake B1 is engaged. In this case, the input rotation is input to the second carrier CR2 by the engagement of the second clutch C2. Further, the rotation of the third sun gear S3 is stopped by the engagement of the first brake B1. In this case, the input rotation of the second carrier CR2 is changed to an increased rotation that is higher than the rotation speed of the aforementioned seventh forward speed, due to the fixed third sun gear S3, and the forward rotation as the eighth forward speed is output via the counter gear 8.

When the first reverse speed (Rev1) is selected, the third clutch C3 is engaged, and the second brake B2 is engaged. In this case, the reduced rotation of the first ring gear R1, which has been reduced by the fixed first sun gear S1 and the first carrier CR1 rotating at the input rotation, is input to the third sun gear S3 via the third clutch C3. Further, the rotation of the second carrier CR2 is stopped by the engagement of the second brake B2. In this case, the reduced rotation input to the third sun gear S3 is output to the second ring gear R2 via the fixed second carrier CR2, and the reverse rotation as the first reverse speed is output from the counter gear 8.

When the second reverse speed (Rev2) is selected, the fourth clutch C4 is engaged, and the second brake B2 is engaged. In this case, the input rotation of the first carrier CR1 is input to the third sun gear S3 by the engagement of the fourth clutch C4. Further, the rotation of the second carrier CR2 is stopped by the engagement of the second brake B2. In this case, the input rotation input to the third sun gear S3 is output to the second ring gear R2 via the fixed second carrier CR2, and the reverse rotation as the second reverse speed is output via the counter gear 8.

It should be noted that, in the P (parking) range or the N (neutral) range, for example, the first clutch C1, the second clutch C2, the third clutch C3, and the fourth clutch C4 are released. In this case, the power transmission between the first carrier CR1 and the third sun gear S3, the power transmission between the first ring gear R1 and the third sun gear S3, and the power transmission between the first ring gear R1 and the second sun gear S2 are disengaged. That is, the power transmission between the planetary gear DP and the planetary gear unit PU is disengaged. Further, the power transmission between the input shaft 7 and the second carrier CR2 is disengaged. This disengages the power transmission between the input shaft 7 and the planetary gear unit PU, thereby disengaging the power transmission between the input shaft 7 and the counter gear 8.

Figure 3:
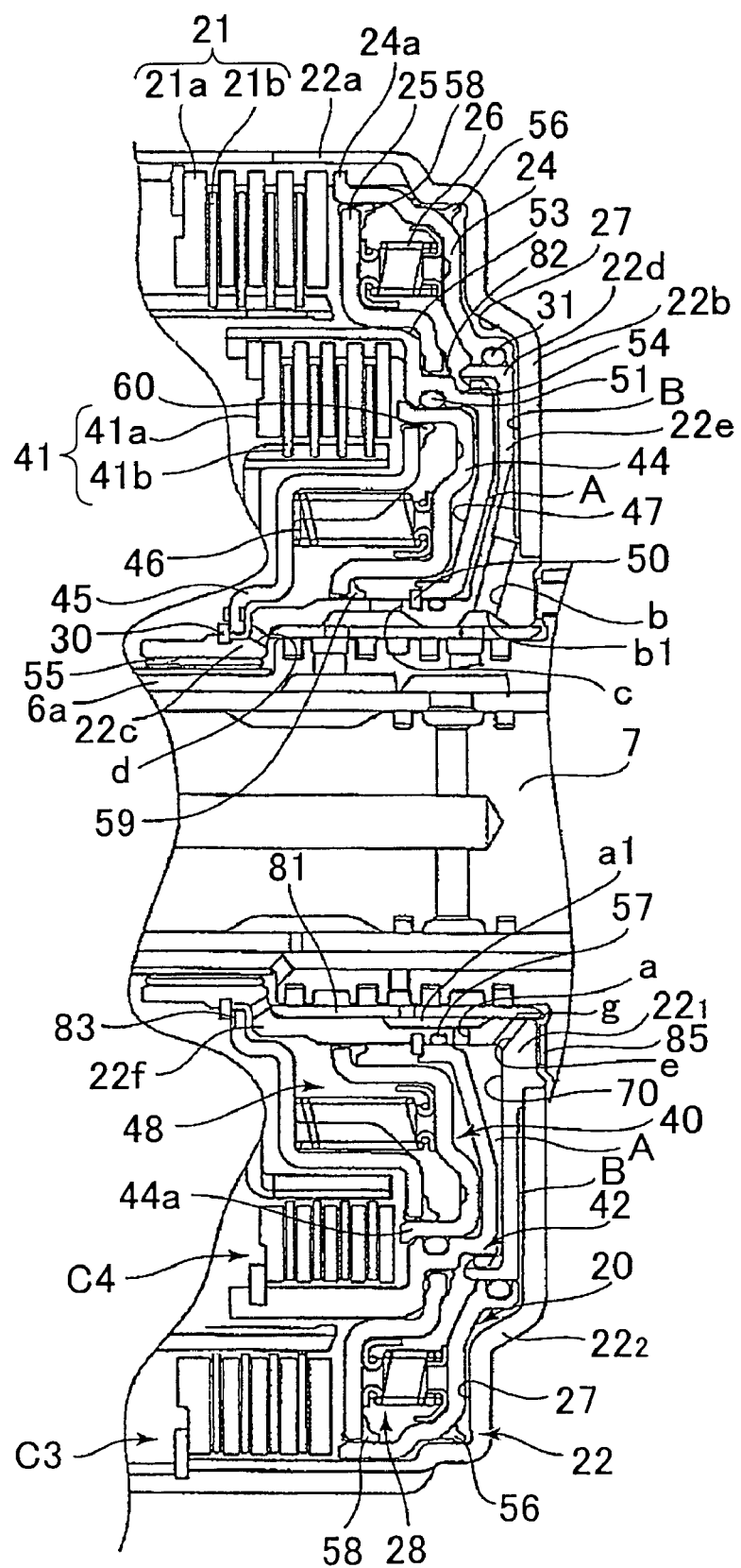
FIG. 3 is an enlarged cross-sectional view that shows a part of an automatic transmission according to a first embodiment of the present invention.
Figure 4:
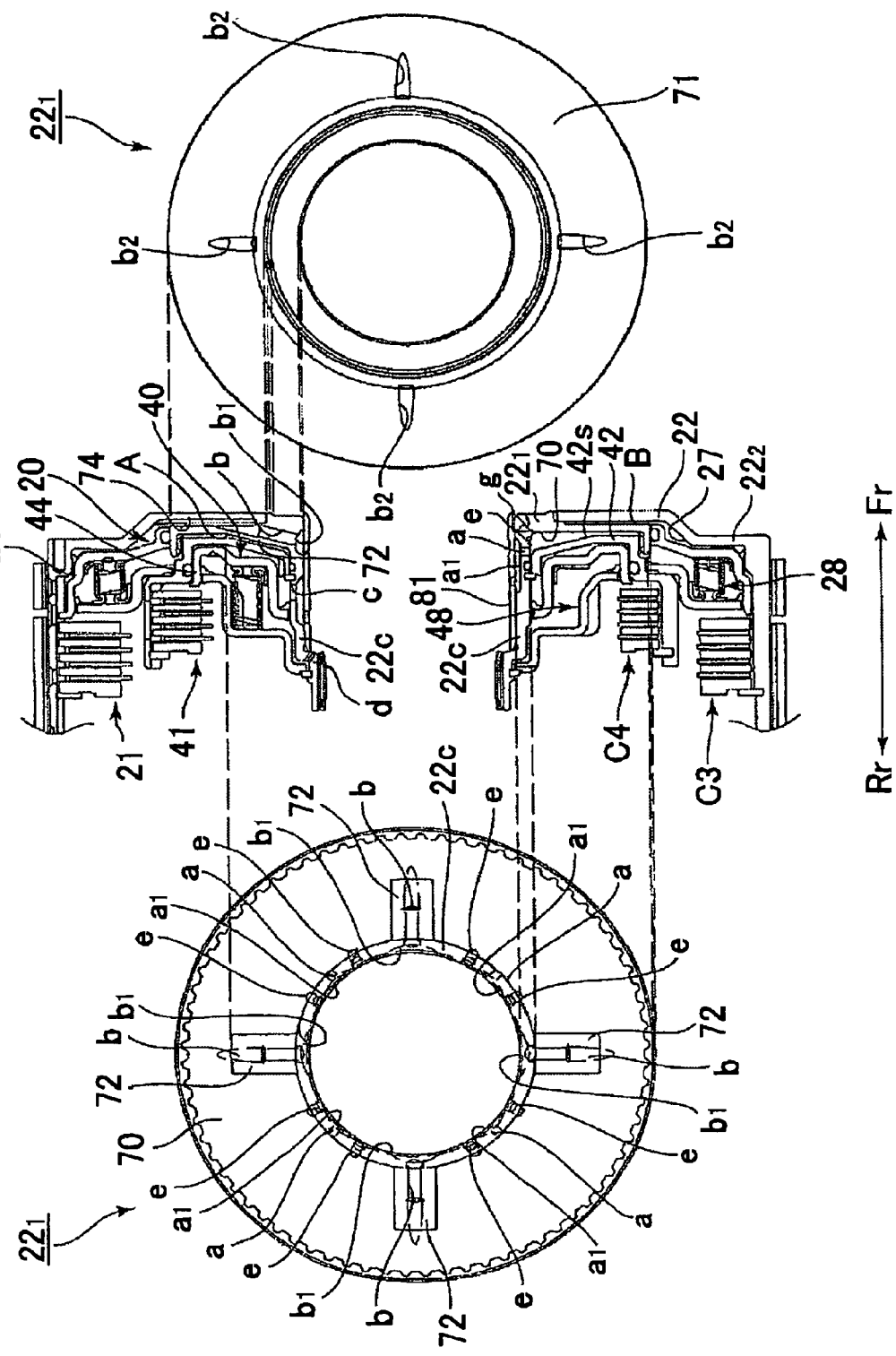
FIG. 4A is a plan view that shows an inner drum according to the first embodiment, when viewed from the Rr direction.
FIG. 4B is an enlarged cross-sectional view that shows a part of the automatic transmission according to the first embodiment.
FIG. 4C is a plan view that shows the inner drum according to the first embodiment, when viewed from the Fr direction.
Figure 5:
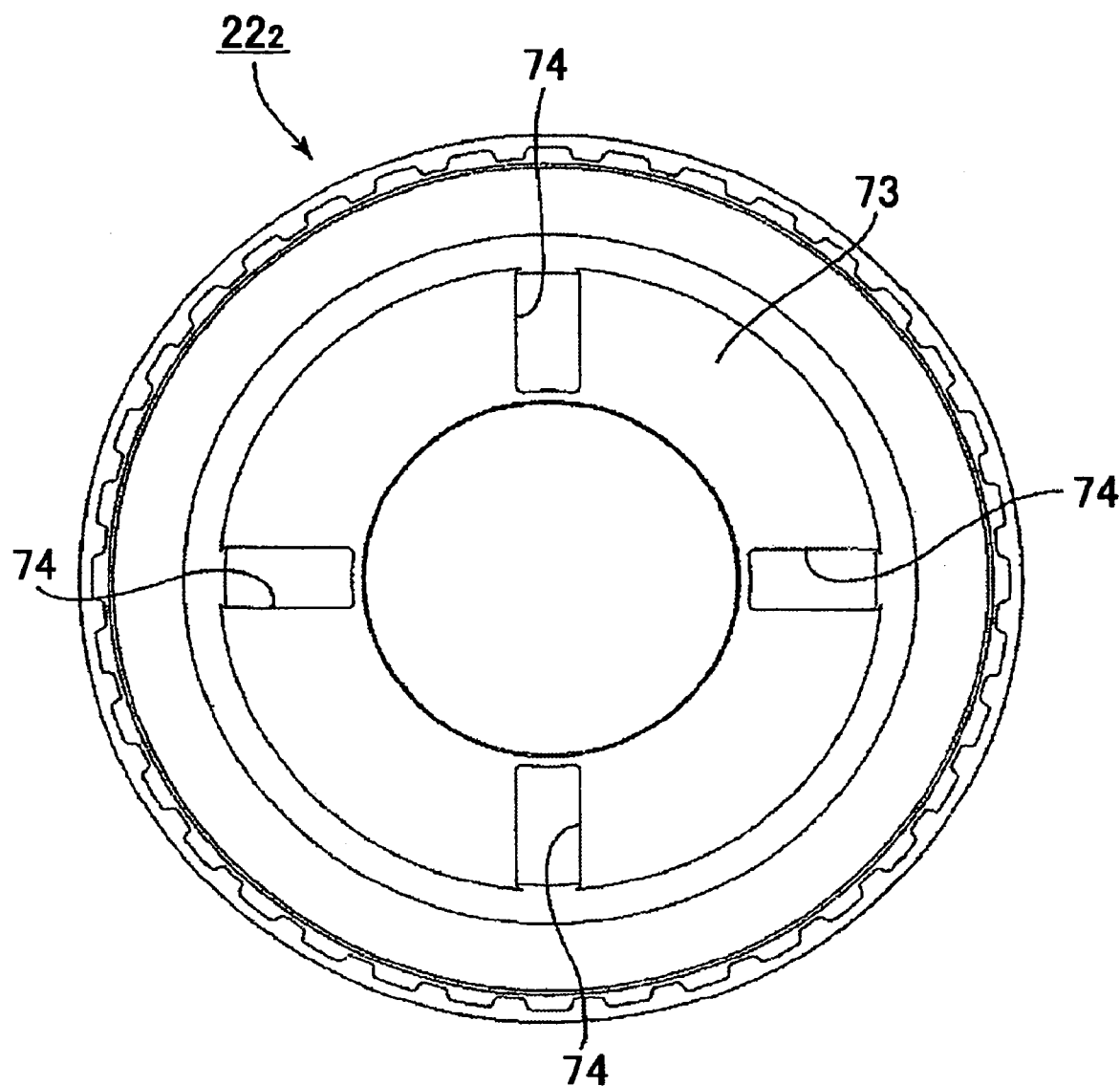
FIG. 5 is a plan view that shows an outer drum according to the first embodiment, when viewed from the Rr direction.

Nest, in the automatic transmission 1, the structure of the third clutch (the one clutch) C3 and the fourth clutch (the other clutch) C4 according to a first embodiment of the present invention will be described with reference to FIG. 3 through FIG. 5. The fourth clutch C4 positioned on the radially inner side and the third clutch C3 are arranged in a two-stage form such that the fourth clutch C4 is stored within the third clutch C3. That is, the third clutch C3 is arranged on the radially outer side of the fourth clutch C4, and the third clutch C3 and the fourth clutch C4 are arranged at different positions with respect to the radial direction such that they overlap in the axial direction.

The hydraulic servo 20 of the third clutch C3 includes a clutch drum 22, a piston 24, a cancel plate 25, and a return spring 26, which form an hydraulic oil chamber 27, and which also form the cancel oil chamber 28 on the rear side thereof. The clutch drum 22 is formed of an inner drum (inner peripheral side member) $22_1$ and an outer drum (outer peripheral side member) $22_2$ provided as a single unit by welding or the like. The inner drum $22_1$ is provided on the radially inner side and has a boss portion 22c and a piston support portion 22e formed therein. The outer drum $22_2$ has a drum portion 22a and a bottom portion 22b formed therein. The drum portion 22a extends to the rear side of the first clutch C1 (not shown) along the outer peripheral side. The boss portion 22c is rotatably supported by a stator shaft (fixed member) 6a through a bush 55. Furthermore, the boss portion 22c and the drum portion 22a are connected through the bottom portion 22b. Moreover, a sleeve 81 is fixedly fitted to the inner peripheral surface of the boss portion 22c. Note that the converter housing and the transmission case are integrally connected and designated as the case 6. In addition, the case and the members integrated with the case are fixed members, which include the case, an oil pump cover and its case, the stator shaft 6a and the like. Therefore, the first sun gear S1 and the boss portion 22c of the clutch drum 22 may be fixed and rotatably supported by any fixed members such as the case or the fixed members integrated with the case as well as the stator shaft 6a, respectively.

At an intermediate position of the bottom portion 22b of the clutch drum 22, a collar portion 22d is formed on the outer edge of the piston support portion 22e extending from the boss portion 22c toward the radially outer side. The collar portion 22d extends a considerably shorter distance than the drum portion 22a and the boss portion 22c and in the same direction as the drum portion 22a and the boss portion 22c. Furthermore, the collar portion 22d is connected, at the outer peripheral surface thereof, to the piston 24 through an O-ring 31 in an oil-tight manner. Moreover, the collar portion 22 is splined, at the inner peripheral surface thereof, to a clutch drum 42 of the fourth clutch C4 described later, using a splined portion 54.

The second carrier CR2 is connected to a second clutch C2 to which the rotation of the input shaft 7 is input. Such an arrangement allows the second carrier CR2 to receive the input rotation via the second clutch C2. Moreover, the second carrier CR2 is connected to a one-way clutch F1 and a second brake B2. Such an arrangement permits the second carrier CR2 to rotate only in one direction with respect to the case 6 via the one-way clutch 1, and allows the rotation of the second carrier CR2 to be stopped by the second brake B2. The second ring gear R2 is connected to a counter gear 8 rotatably supported by a center support member fixed to the case 6.

The piston 24 is fitted with the collar portion 22d such that it can move in the axial direction. The outer peripheral surface of the piston 24 is connected to the inner peripheral surface of the clutch drum 22 through a seal member 56 in an oil-tight manner. The piston 24 and the inner peripheral surface of the clutch drum 22, which is in the form of a cylinder, define the aforementioned hydraulic oil chamber 27. Furthermore, the piston 24 has an extension portion 24a extending toward the rear side, which allows the third clutch C3 to be engaged/disengaged by the extension portion 24a pressing the friction member 21.

The clutch drum 42 of the fourth clutch C4 is provided at the boss portion 22c of the third clutch C3 through an O-ring 57 in an oil-tight manner, while the position of the clutch drum 42 in the axial direction is restricted by a snap ring 50. Furthermore, the clutch drum 42 has a step portion 53 having a step-shaped cross section at the rear of the splined portion 54 that connects the clutch drum 42 and the collar portion 22d of the third clutch C3.

The cancel plate 25 of the third clutch C3 abuts against the step portion 53 that is provided on the clutch drum 42 of the fourth clutch C4 so as to be restricted to the rearward movement in the axial direction. The cancel plate 25 is connected, at the outer periphery thereof, to the piston 24 through a seal member 58 in an oil-tight manner. Further, the cancel plate 25 is fitted, in the inner periphery thereof, to the clutch drum 42 of the fourth clutch through a seal member 82 in an oil-tight manner. The outer peripheral surface of the cancel plate 25 and the inner peripheral surface of the piston 24 define the aforementioned cancel oil chamber 28 that provides an oil pressure that balances the centrifugal oil pressure that generated in the hydraulic oil chamber 27 of the third clutch. In addition, the return spring 26 is provided between the cancel plate 25 and the piston 24, and always urges the piston 24 to the front. It should be noted that the return spring 26 has an urging force greater than that of a return spring 46 provided in the cancel oil chamber 48 of the fourth clutch C4.

The hydraulic oil chamber 27 of the third clutch C3 is supplied with oil from oil holes b, via a predetermined gap B provided between the piston support portion 22e of the inner drum $22_1$ and the bottom portion 22b of the outer drum $22_2$. Because the gap B is provided over the entire circumference so as to extend in a planar manner, the oil passage has a large cross sectional area, as compared to a case where an oil passage hole is employed, while it is short (i.e., has a narrow space) in the axial direction.

The cancel oil chamber 28 of the third clutch C3 is supplied with lubricating oil from oil holes a via a space (gap) A provided between the clutch drum 42 of the fourth clutch C4 and the rear surface of the piston support portion 22e in the inner drum $22_1$ of the third clutch C3. The space A has a relatively large space in the axial direction at the central portion (portion near the input shaft 7). On the other hand, the space A is a narrow gap on the radially outer side. However, the space A is provided such that it extends over the entire circumference in a planar manner, so that the oil passage has a large cross-sectional area, as compared to a case where an oil passage hole is employed, while maintaining a narrow gap between the clutch drums 22 and 42 in the axial direction (thereby reducing the dimension in the axial direction). It should be noted that a notch is formed in the splined portion 54 provided between the clutch drum 42 of the fourth clutch C4 and the collar portion 22e of the third clutch C3 so as not to prevent the flow of oil through the oil passage.

The hydraulic servo 40 of the fourth clutch C4 includes the clutch drum 42, a piston 44, the cancel plate 45, and the return spring 46, which define an hydraulic oil chamber 47, as well as the cancel oil chamber 48 on the rear side thereof.

The piston 44 is provided to the boss portion 22c of the clutch drum 22 of the third clutch C3 through a seal member 59 in an oil-tight manner so as to be movable in the axial direction. Furthermore, the piston 44 has an extension portion 44a for pressing the friction member 41, and the outer peripheral surface of the extension portion 44a and the inner peripheral surface of the clutch drum 42 are fitted with each other through an O-ring 51 in an oil-tight manner.

The hydraulic oil chamber 47 of the fourth clutch C4 is defined by the outer peripheral surface of the piston 44 and the inner peripheral surface of the clutch drum 42 in the form of a cylinder. The hydraulic oil chamber 47 is supplied with oil via oil holes c formed in the boss portion 22c.

The cancel plate 45 of the fourth clutch C4 is provided such that its position in the axial direction is restricted by a snap ring 30. The cancel plate 45 is fitted with the inner peripheral surface of the piston 44 through a seal member 60 in an oil-tight manner.

The cancel oil chamber 48 is defined by the inner surface of the cancel plate 45 and the rear surface of the piston 44, and provides an oil pressure that balances the centrifugal oil pressure generated in the hydraulic oil chamber 47 of the fourth clutch C4. The return spring 46 is provided between the piston 44 and the cancel plate 45, and always urges the piston to the front. The cancel oil chamber 48 is supplied with lubricating oil through oil holes d. Furthermore, a recessed groove 83 is formed in the cancel plate 45 on the inner peripheral side thereof, which allows the lubricating oil to be discharged from between cancel oil chamber 48 and the snap ring 30.

Further detailed description will be made regarding the oil passage structure with reference to FIG. 4 and FIG. 5.

As described above, the hydraulic oil chamber 27 of the third clutch C3 is supplied with the oil from the oil holes b via the gap B, and the cancel oil chamber 28 is supplied with the lubricating oil from the oil holes a via the space A. The aforementioned gap B is provided such that it extends in a planar manner between an outer surface 71 of the inner drum $22_1$, which is the surface of the inner drum $22_1$ that faces the outer drum $22_2$, and an inner surface 73 of the outer drum $22_2$. On the other hand, the space A is provided such that it extends in a planar manner between an inner surface (rear surface) 70 of the inner drum $22_1$, and an outer surface 42s, which serves as the rear surface of the hydraulic oil chamber of the clutch drum 42 of the fourth clutch C4. The clutch drum 42 is configured such that a radially inner portion thereof is inclined to the rear. The inner drum 22, has the rear surface 70 that vertically extends. With this arrangement, the space A is defined such that a large space is secured in the axial direction for the central side thereof, but a small space for the radially outer side.

Four rib-shaped protruding portions (protrusions) 72 are formed on the circumference of the rear surface 70 of the inner drum 22, such that they protrude toward the fourth clutch C4. Each of the protruding portions 72 is inclined in the radial direction, along the inclined surface of the clutch drum 42. The oil hole b is formed in each protruding portion 72 to supply oil to the hydraulic oil chamber 27. The oil holes b pass through the inner drum $22_1$, and openings b2 are formed on the outer surface 71 of the inner drum $22_1$. In addition, openings b1 are formed on the radially inner side thereof so as to communicate with a hole formed in the sleeve 81. It should be noted that the number of the protruding portions 72 is not restricted to four, and it may be three, five, or other numbers.

As shown in FIG. 4A, the inner drum $22_1$ has the cylinder-shaped boss portion 22c that is formed at the radially inner side thereof and that includes the above-described oil holes b, the oil holes a, and discharge holes e, which are located at different phases in the circumference direction. The oil holes a allow lubricating oil to be supplied to the cancel oil chamber 28, and the discharge holes e discharges the lubricating oil. Note that both the oil holes a and the discharge holes e are located at different phases in the circumference direction (In FIG. 4B, the holes a and e are shown in the same cross section for convenience of explanation, but actually part of them are not in the same cross section.). With this arrangement, the oil holes b are provided at four locations on the circumference of the boss portion 22c, like the protruding portions 72. The oil hole a is provided between the oil holes b such that it is positioned between the adjacent discharge holes e. Moreover, oil reservoirs a1 and b1 are respectively provided to the oil holes a and b for oil supply at the radially inner side of the oil holes, such that they have a large size in the circumference direction.

Grooves 74 are provided on the inner surface 73 of the outer drum $22_2$ that faces the outer surface 71 of the inner drum $22_1$ such that they face the respective openings $b_2$ of the oil holes b formed on the outer surface 71. The grooves 74 radially extend on the inner surface 73 in the radially outer direction. Furthermore, each groove 74 is formed as a slender rectangular recessed portion extending over the entire length of the gap B up to the hydraulic oil chamber 27. This arrangement provides a large cross sectional area of the gap B as the oil passage, without having to extend the gap B in the axial direction. In addition, this arrangement allows the gap B to be rapidly filled with oil supplied from the openings b2 of the oil holes b, in the circumference direction.

On the other hand, a portion of the rear surface 70 of the inner drum $22_1$ that has no protruding portions 72, i.e., the portion of the rear surface 70 that is located at the same phase as that of the oil holes a and the discharge holes e, is formed to be recessed toward the outer drum $22_2$ (in the Fr direction). This portion of the rear surface 70 and the clutch drum 42 of the fourth clutch C4 define the space A for supplying lubricating oil to the cancel oil chamber 28. By forming the portion of the rear surface 70 to be recessed in alignment with the oil holes a and the discharge holes e, a large oil passage cross sectional area of the space A can be secured without having to extend the space A in the axial direction.

The clutch drum 22 of the third clutch C3 has a structure in which the protruding portions 72 of the inner drum $22_1$ and the grooves 74 of the outer drum $22_2$ are correspondingly arranged at the same phase on the circumference. Furthermore, the recessed portion of the rear surface 70 of the inner drum $22_1$, and a portion of the inner surface 73 having no grooves 74 are correspondingly arranged at the same phase on the circumference. Thus, the thin-walled structure is achieved, while maintaining high rigidity.

The fourth clutch C4 may be formed such that the oil holes c for supplying oil to the hydraulic oil chamber 47 and the oil holes d for supplying lubricating oil to the cancel oil chamber 48 are arranged on the circumference thereof at the same phase or at different phases. Furthermore, grooves may be formed on the inner peripheral surface of the clutch drum 42 that defines the hydraulic oil chamber 47 such that they extend radially in the radially outward direction, like the third clutch C3.

Each discharge hole e of the cancel oil chamber 28, which communicates with the space A, is formed at the corner of the clutch drum (inner drum) 22 in the form of a through hole extending obliquely from the space A to the front (Fr) and toward the radially inner side. Further, recessed grooves g are formed on the outer peripheral surface of the sleeve 81 such that they are aligned with the respective through holes. Each of the recessed grooves g communicates with an opening formed in the front end of the clutch drum. The front end of the clutch drum 22 faces a stepped portion of the stator sleeve 6a via a washer 85. With this arrangement, the oil discharged from the recessed grooves g is supplied to the washer 85. As a result, the cancel oil chamber 28 communicates with the exterior on the front side, i.e., the closed side (hydraulic oil chamber side) of the clutch drum 22 via the space A, the discharge holes e, and the recessed grooves g.

Furthermore, the oil hole c is formed in the boss portion 22c of the clutch drum 22 such that it is positioned opposite to the discharge hole e, with respect to the hole a for supplying oil to the cancel oil chamber 28 of the third clutch C3, in the axial direction. The oil hole c allows oil pressure to be supplied/discharged to/from the hydraulic oil chamber 40 of the fourth clutch C4. Thus, the hydraulic oil chamber 40 of the fourth clutch C4 is arranged tightly at a position opposite to the hydraulic oil chamber side of the space A, which is an oil supply/discharge passage to/from the cancel oil chamber 28 of the third clutch, in the axial direction.

Next, the operations of the third clutch C3 and the fourth clutch C4 will be described.

The third clutch C3 is structured such that oil pressure generated in the hydraulic oil chamber 27 moves the piston 24 in the axial direction to press the friction member 21. The hydraulic oil chamber 27 is supplied with the hydraulic oil at an oil pressure generated by an oil pump (not shown) from the oil holes b formed in the clutch drum 22, via the gap B, which is formed over the entire circumference so as to extend in a planar manner, and the grooves 74.

Furthermore, the centrifugal oil pressure occurs in the hydraulic oil chamber 27. To address this, the lubricating oil is supplied to the cancel oil chamber 28, which faces the hydraulic oil chamber 27 with the piston 24 therebetween, from the oil holes a via the space A provided to extend over the entire circumference in a planar manner. Thus, a centrifugal oil pressure is generated in the cancel oil chamber 28, and is used to balance the centrifugal oil pressure occurring in the hydraulic oil chamber 27. With this arrangement, the cancel oil chamber 28 is sealed on both the radially inner side and the radially outer side of the cancel plate 25 by means of the seal members 58 and 82. In addition, the cancel oil chamber 28 communicates with the radially inner side in an oil-tight manner by the space A, thereby communicating with the exterior via the discharge holes e and the recessed grooves g. With this arrangement, the point as the base point of the centrifugal oil pressure is set to the oil pressure level of the recessed grooves g. Thus, the centrifugal pressure is applied that matches that in the hydraulic oil chamber 27 positioned on the radially outer side.

Similarly, the fourth clutch C4 is structured such that, when the hydraulic oil is supplied to the hydraulic oil chamber 47 via the oil holes c by means of an oil pump (not shown), the piston 44 moves in the axial direction to press the friction member 41, thereby allowing the fourth clutch C4 to be engaged/disengaged. In addition, lubricating oil is supplied to the cancel oil chamber 48 via the oil holes d to generate a centrifugal oil pressure in the cancel oil chamber 48, which balances the centrifugal oil pressure occurring in the hydraulic oil chamber 47.

Accordingly, when the third clutch C3 is disengaged, the pressurized oil in the hydraulic oil chamber 27 is drained via the gap B, the grooves 74, and the oil holes b. However, the centrifugal oil pressure occurs in the hydraulic oil chamber 27 due to the rotation of the clutch drum 22. At this time, the urging force of the return spring 26 and the centrifugal oil pressure applied to the oil in the cancel oil chamber 48 are applied to the rear surface of the piston 24. Accordingly, the piston 24 is rapidly moved in the insertion/retraction direction against the centrifugal oil pressure of the hydraulic oil chamber 27, and the capacity of the cancel oil chamber 28 is thereby increased. In this case, the oil is rapidly supplied via the space A between the clutch drums 22 and 42 without delaying the operation of the third clutch C3.

On the other hand, when the third clutch C3 is connected, the oil pressure is rapidly supplied to the hydraulic oil chamber 27 via the gap B, the grooves 74, and the oil holes b. This leads to a rapid discharge of the oil from the cancel oil chamber 28 via the space A, the dedicated discharge holes e, and the recessed grooves g, without any adverse effect on the high-speed action of the piston 24. Further, the oil directly discharged to the outside of the clutch drum 22 via the discharge holes e and the recessed grooves g lubricates the washer 85.

As described above, according to the automatic transmission 1 of the present invention, the third clutch C3 and the fourth clutch C4 are arranged at different positions with respect to the radial direction such that they overlap in the axial direction. Here, the third clutch C3 is disposed on the radially outer side of the fourth clutch C4. With this arrangement, the clutch unit and the automatic transmission can be compactly structured in the axial direction. In addition, an oil passage b is formed on the radially inner side of the clutch drum 22 of the third clutch C3, and a gap B is provided on the radially outer side thereof between the clutch drum 22 and the piston support portion 22e so as to extend in a planar manner. Thus, oil pressure can be rapidly supplied/discharged to/from the hydraulic oil chamber 27 of the third clutch C3. Further, by providing the grooves 74 in the gap B, the oil pressure can be supplied/discharged to/from the hydraulic oil chamber 27 of the third clutch C3 further rapidly.

Furthermore, the space A provided between the clutch drum 22 of the third clutch C3 and the clutch drum 42 of the fourth clutch C4 is structured as an oil passage to the cancel oil chamber 28 of the third clutch C3. Moreover, the gap B is used as an oil passage to the hydraulic oil chamber 27. Thus, the clutch drum 22 is formed with a small thickness, thereby allowing the clutch drum 22 to have a reduced size in the axial direction. The grooves 74 may be formed in the third clutch C3, and the recessed portion may be formed in the rear surface 70 of the inner drum $22_1$. In this case, the grooves 74 and the recessed portion of the rear surface 70 are formed at different phases in the circumference direction, thereby maintaining high rigidity of the clutch drum 22 of the third clutch C3 as a whole.

Furthermore, the oil from the cancel oil chamber 28 is directly discharged to the exterior of the closed side of the clutch drum 22, via the space A, the discharge holes e, and the recessed grooves g. Accordingly, on the open side of the clutch drum 22, it is possible to dispose the hydraulic oil chamber and the like of the other clutch, i.e., the clutch C3, in a compact manner. This arrangement makes the clutch structure compact, leading to provide a compact automatic transmission, particularly in the axial direction.

Figure 6:
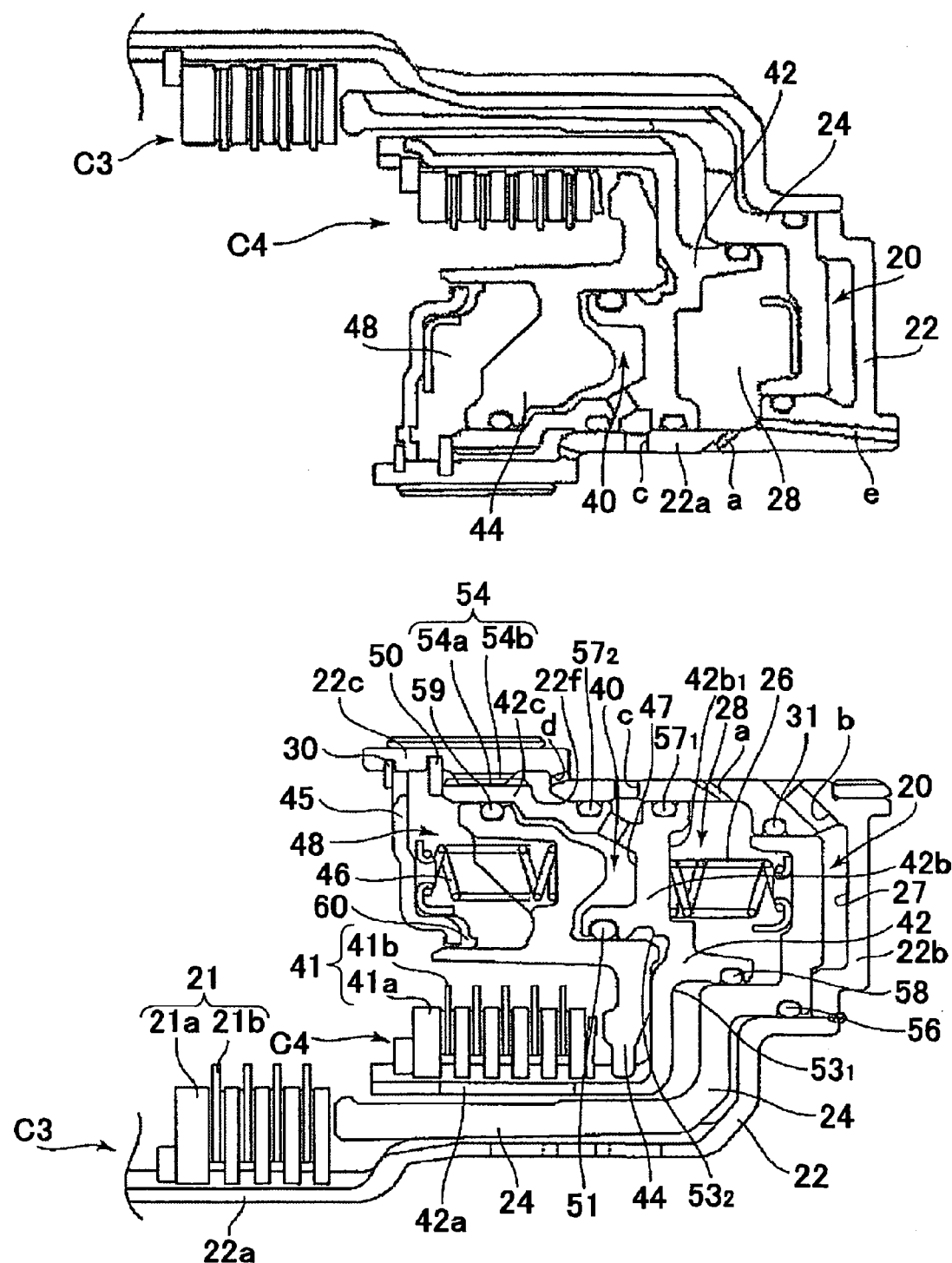
FIG. 6 is a cross-sectional view that shows clutch components according to another embodiment.

Next, a second embodiment of the present invention will be described with reference to FIG. 6. In the second embodiment, the third clutch C3 and the fourth clutch C4 are arranged at different positions in the radial direction such that they are in parallel with each other in the axial direction. The components that correspond to the third clutch C3 and the fourth clutch C4 shown in FIG. 3 are denoted by the same reference numerals used in FIG. 3.

The fourth clutch C4 on the radially inner side and the third clutch C3 on the radially outer side are arranged at different positions in the axial direction such that they are positioned adjacent to one another. An outer surface $42b_1$ of a flange portion 42b of the clutch drum 42 of the fourth clutch C4 positioned on the radially inner side is also used as a cancel plate that defines the cancel oil chamber 28 of the third clutch C3.

The hydraulic servo 20 of the third clutch C3 has the clutch drum 22, the piston 24, the flange portion 42b of the clutch drum 42 of the fourth clutch C4, which serves as a cancel plate, and the return spring 26. The hydraulic servo 20 defines the hydraulic oil chamber 27, and also defines the cancel oil chamber 28 on the rear side thereof. The clutch drum 22 has the inner peripheral side member in which the boss portion 22c and the bottom portion 22b are formed, and the outer peripheral side member in which the drum portion 22a is formed, and is provided as a single unit by welding or the like. An outer spline 54a is formed in the boss portion 22c, and is engaged with an inner spline 54b formed in a boss portion 42c of the clutch drum 42 of the fourth clutch C4 described later. By means of the splined portion 54, the clutch drum 22 of the third clutch C3 and the clutch drum 42 of the fourth clutch C4 are structured such that they rotate in the same direction.

The radially inner side of the piston 24 is provided on the boss portion 22c of the third clutch C3 through the O-ring 31 in an oil-tight manner such that the piston 24 can be moved in the axial direction. In addition, the outer peripheral surface of the piston 24 is fitted with the inner peripheral surface of the clutch drum 22 of the third clutch C3 through the seal member 56 in an oil-tight manner. The hydraulic oil chamber 27 is defined by the outer peripheral surface of the piston 24 and the inner peripheral surface of the clutch drum 22 of the third clutch C3, and oil is directly supplied to the hydraulic oil chamber 27 from the oil holes b provided in the boss portion 22c of the clutch drum 22.

The clutch drum 42 of the fourth clutch C4 includes the boss portion 42c formed on the radially inner side in the form of a cylinder, the flange portion 42b extending from the boss portion 42c toward the radially outer side, and the drum portion 42a that is splined to the outer friction plates 41a. With this arrangement, the movement of the clutch drum 42 is restricted in the axial direction by the snap ring 50 formed in the boss portion 22c of the third clutch C3. Furthermore, the drum portion 42a has two L-shaped stepped portions $53_1$ and $53_2$ on the radially outer side of the flange portion 42b. Of the two L-shaped stepped portions, the stepped portion $53_2$ positioned on the radially inner side is formed so as to extend to the rear of the transmission. On the other hand, the stepped portion $53_1$ positioned on the radially outer side is formed so as to extend to the front.

In the clutch drum 42 of the fourth clutch C4, the boss portion 42c is fitted with the boss portion 22c of the third clutch C3 through O-rings $57_1$ and $57_2$ in an oil-tight manner. Furthermore, the outer peripheral surface of the outer stepped portion $53_1$ is fitted with the inner peripheral surface of the piston 24 of the third clutch C3 through the seal member 58 in an oil-tight manner.

The cancel oil chamber 28 of the third clutch C3 is defined by the outer surface $42b_1$ of the flange portion 42b of the fourth clutch C4 and the rear surface of the piston 24 of the third clutch C3, and lubricating oil is supplied to the cancel oil chamber 28 via the oil holes a formed in the boss portion 22c of the third clutch C3. Furthermore, the return spring 26 is provided between the outer surface $42b_1$ of the flange portion 42b of the fourth clutch C4 and the inner peripheral surface of the piston 24 of the third clutch C3. The return spring 26 has a greater urging force than that of the return spring 46 provided to the fourth clutch C4 described later. Accordingly, the clutch drum 42 of the fourth clutch C4 is always urged toward the rear, and the position of the clutch drum 42 is fixed by the snap pin 50 in contact therewith.

The hydraulic servo 40 of the fourth clutch C4 has the clutch drum 42, the piston 44, the cancel plate 45, and the return spring 46. The hydraulic servo 40 defines the hydraulic oil chamber 47, and also defines the cancel oil chamber 48 on the rear side thereof.

The piston 44 is provided on the boss portion 42c of the clutch drum 42 through the seal member 59 in an oil-tight manner such that it can move in the axial direction. Furthermore, the piston 44 is fitted via the O-ring 51 with the outer peripheral surface of the inner stepped portion $53_2$ formed in the clutch drum 42 of the fourth clutch C4. The hydraulic oil chamber 47 of the fourth clutch C4 is defined by the outer peripheral surface of the piston 44 and the inner peripheral surface of the clutch drum 42 that is in the form of a cylinder. With this arrangement, oil is supplied to the hydraulic oil chamber 47 via the oil holes c.

In addition, the movement of the cancel plate 45 of the fourth clutch C4 is restricted in the axial direction by the snap ring 30 formed in the boss portion 22c of the third clutch C3. Furthermore, the cancel plate 45 is fitted, on the radially outer side thereof, with the inner peripheral surface of the piston 44 of the fourth clutch C4 through the seal member 60 in an oil-tight manner. The cancel oil chamber 48 is defined by the outer peripheral surface of the cancel plate 45 and the inner peripheral surface of the piston 44, and provides the oil pressure that balances the centrifugal oil pressure that occurs in the hydraulic oil chamber 47 of the fourth clutch C4. With this arrangement, lubricating oil is supplied to the cancel oil chamber 48 via the oil holes d. The return spring 46 is provided between the piston 44 and the cancel plate 45, and always urges the piston 44 to the front.

The cancel oil chamber 28 of the third clutch C3 directly communicates with the exterior on the closed side (hydraulic oil chamber side) of the clutch drum 22 via the dedicated discharge holes e formed in the boss portion 22c of the clutch drum 22. It should be noted that, in the boss portion 22c, the discharge holes e for the cancel oil chamber 28 of the third clutch C3 is provided opposite to the oil supply/discharge holes c for the hydraulic oil chamber 47 of the fourth clutch C4, with respect to the oil supply holes a for the cancel oil chamber 28, in the axial direction.

Next, the operations of the third clutch C3 and the fourth clutch C4 according to the second embodiment will be described.

The third clutch C3 is structured such that oil pressure generated in the hydraulic oil chamber 27 moves the piston 24 in the axial direction to press the friction member 21. The hydraulic oil chamber 27 is supplied with the hydraulic oil at an oil pressure generated by an oil pump (not shown) through the oil holes b formed in the clutch drum 22.

The centrifugal oil pressure occurs in the hydraulic oil chamber 27. To address this, the lubricating oil is directly supplied from the oil holes a to the cancel oil chamber 28, thereby generating a centrifugal oil pressure in the cancel oil chamber 28 to balance the centrifugal oil pressure occurring in the hydraulic oil chamber 27. The oil stored in the cancel oil chamber 28 is directly discharged to the outside from the clutch drum 22 via the discharge holes e.

Similarly, the fourth clutch C4 is structured such that, when the hydraulic oil is supplied to the hydraulic oil chamber 47 via the oil holes c by means of an oil pump (not shown), the piston 44 moves in the axial direction to press the friction member 41, thereby allowing the fourth clutch C4 to be engaged/disengaged. In addition, lubricating oil is supplied to the cancel oil chamber 48 via the oil holes d to generate a centrifugal oil pressure in the cancel oil chamber 48, which balances the centrifugal oil pressure occurring in the hydraulic oil chamber 47.

Accordingly, when the third clutch C3 is disengaged, the pressurized oil in the hydraulic oil chamber 27 is drained via the oil holes b. However, the centrifugal oil pressure occurs in the hydraulic oil chamber 27 due to the rotation of the clutch drum 22. At this time, the urging force of the return spring 26 and the centrifugal oil pressure applied to the oil in the cancel oil chamber 48 are applied to the rear surface of the piston 24. Accordingly, the piston 24 is rapidly moved in the insertion/retraction direction against the centrifugal oil pressure of the hydraulic oil chamber 27.

The following cases may occur; for example, a case in which, the axial force that moves the clutch drum 22 of the third clutch C3 and the clutch drum 42 of the fourth clutch C4 in the opposite direction is not applied thereto, such as when the third clutch C3 and the fourth clutch C4 are disengaged at the same time; and a case in which the force is applied that causes the clutch drum 42 of the fourth clutch C4 to approach the clutch drum 22 of the third clutch C3, such as when the piston 44 of the fourth clutch C4 is stroked in order to engage the fourth clutch C4. Even in such cases, because the installation load of the return spring 26 of the third clutch C3 (the load in the state where the return spring 26 is not compressed when the piston 24 is not operating) is set greater than the working load of the return spring 46 of the fourth clutch C4 (the load in the state where the return spring 46 is compressed by the operating piston 44), the urging force of the return spring 26 is directly applied to the clutch drum 42. Therefore, the axial force is always applied to the clutch drums 22 and 42 so as to move them in the opposite direction, and thus the clutch drums 22 and 42 are fixed by means of the snap ring 50.

As described above, according to the automatic transmission 1 of the present embodiment, the flange portion 42b of the clutch drum 42 of the fourth clutch C4 serves as the cancel plate which defines the cancel oil chamber 28 of the third clutch C3. This arrangement provides the automatic transmission 1 having a reduced length in the axial direction.

According to an exemplary aspect of the present invention, discharge holes are provided in a boss portion on the radially inner side of a clutch drum from which oil is supplied to a cancel oil chamber, thereby ensuring a sufficient cancel oil pressure in the cancel oil chamber for canceling the centrifugal oil pressure. Further, dedicated discharge holes are formed in the boss portion, thereby rapidly discharging the oil stored in the cancel oil chamber when oil pressure is supplied to a hydraulic oil chamber. Such an arrangement ensures appropriate clutch timing.

Furthermore, the oil stored in the cancel oil chamber is discharged to the outside of the hydraulic oil chamber side (opposite side of the open side) of the clutch drum via the discharge holes formed in the boss portion. Such an arrangement improves the degree of freedom of the design for a compact automatic transmission, without interference with the layout of components on the cancel plate side of the cancel oil chamber, e.g., the layout of a hydraulic oil chamber of another clutch. In addition, it is possible to use the oil discharged to the outside of the clutch drum to lubricate other members (e.g., a washer).

According to an exemplary aspect of the present invention, recessed grooves are formed in a sleeve fitted to the inner peripheral surface of the boss portion, and the oil from the discharge holes are discharged to the outside of the clutch drum via the recessed grooves. The oil pressure at the recessed grooves formed in the sleeve may be set as the base point of the centrifugal oil pressure in the cancel oil chamber. Thus, it is possible to cancel the centrifugal oil pressure more efficiently with a simple structure.

According to an exemplary aspect of the present invention, oil pressure supply/discharge holes for the hydraulic oil chamber that are formed in the boss portion and the aforementioned discharge holes are arranged at different phases in the circumference direction. Accordingly, it is possible to reliably discharge the oil stored in the cancel oil chamber to the outside of the clutch drum with a simple structure.

According to an exemplary aspect of the present invention, two clutches are arranged adjacent to one another. The oil pressure supply/discharge holes for the hydraulic oil chamber of another clutch are provided in the boss portion on the opposite side of the discharged holes with respect to the oil supply holes for the cancel oil chamber of the one clutch, i.e., the aforementioned clutch. Such an arrangement provides a layout in which the other clutch is arranged close to the cancel plate of the cancel oil chamber of the one clutch. Therefore, it is possible to arrange the two clutches in a compact manner.

According to an exemplary aspect of the present invention, the hydraulic oil chamber and the cancel oil chamber of the one clutch are arranged on the radially outer side of the hydraulic oil chamber and the cancel oil chamber of the other clutch such that they overlap in the axial direction. Such an arrangement provides a compact layout of the two clutches, in particular a compact layout in the axial direction. Furthermore, with such an arrangement, oil pressure is supplied/discharged to/from the hydraulic oil chamber of the one clutch via an oil passage formed in the clutch drum. Moreover, oil is supplied/discharged to/from the cancel oil chamber of the one clutch via a space between the clutch drum of the one clutch and the clutch drum of the other clutch. Therefore, while great centrifugal oil pressure acts on the hydraulic oil chamber of the one clutch positioned on the radially outer side, a cancel oil pressure based on the discharge holes formed in the boss portion of the inner radial side of the clutch drum acts on the cancel oil chamber positioned on the rear surface side of a piston of the hydraulic oil chamber. Thus, the large centrifugal oil pressure in the hydraulic oil chamber is always appropriately canceled, and the oil pressure is supplied/discharged to/from the hydraulic oil chamber rapidly, thereby ensuring appropriate clutch timing.

Furthermore, the hydraulic oil chamber and the cancel oil chamber of the other clutch are arranged in parallel in the axial direction such that they overlap with the aforementioned space in the radial direction, thereby providing a compact layout of the two clutches. Moreover, the aforementioned space and the dedicated supply holes and discharge holes formed in the boss portion are used as an oil supply/discharge passage for the cancel oil chamber of the one clutch, thereby providing a compact automatic transmission, especially, a compact design in the axial direction. Thus, such an arrangement provides a compact design of the automatic transmission, in particular a compact design thereof with respect to the axial direction.

According to an exemplary aspect of the present invention, the radially outer side and the radially inner side of the cancel plate of the one clutch are fitted in an oil-tight manner. Such an arrangement prevents oil leakage and appropriately maintains the cancel oil pressure in the cancel oil chamber positioned on the radially outer side.

According to an exemplary aspect of the present invention, the cancel plate of the one clutch also serves as the clutch drum of the other clutch. With this arrangement, the two clutches are arranged in parallel in the axial direction such that they overlap in the radial direction, thereby providing a compact design, in particular, a compact design in the radial direction.

An exemplary aspect of the present invention provides an automatic transmission that provides eight forward speeds and one reverse speed that has a compact structure. In addition, this automatic transmission ensures sufficient centrifugal oil pressure in a cancel oil chamber of the third clutch and rapidly discharges the oil when oil pressure is supplied to a hydraulic oil chamber, thereby providing smooth shifting at appropriate clutch timing.

What is claimed is:

1. An automatic transmission, comprising
  one clutch that includes:
    a clutch drum;
    a piston that forms a hydraulic oil chamber using a part of the clutch drum as a cylinder;
    a plurality of friction plates that engage with the clutch drum; and
    a cancel oil chamber that is provided on a rear side of the piston and that cancels a centrifugal oil pressure that acts on the hydraulic oil chamber, wherein:
  oil is supplied to the cancel oil chamber from a boss portion formed in the clutch drum on a radially inner side, and the oil is discharged from discharge holes formed in the boss portion to an outside of a hydraulic oil chamber side of the clutch drum,
  a sleeve is fitted to an inner peripheral surface of the boss portion;
  recessed grooves are formed in an outer peripheral surface of the sleeve such that they are aligned with the discharge holes and extend up to an end face; and
  the oil from the cancel oil chamber is discharged via the discharge holes and the recessed grooves.

2. The automatic transmission according to claim 1, wherein:
  oil pressure is supplied/discharged to/from the hydraulic oil chamber via oil holes formed in the boss portion; and
  the oil holes for the hydraulic oil chamber and the discharge holes for the cancel oil chamber are arranged at different positions in a circumference direction of the boss portion.

3. The automatic transmission according to claim 1, further comprising:
  an other clutch that is disposed adjacent to the one clutch, the other clutch includes:
    a clutch drum;
    a piston that forms a hydraulic oil chamber using a part of the clutch drum as a cylinder;
    a plurality of friction plates that engage with the clutch drum; and
    a cancel oil chamber that cancels a centrifugal oil pressure that acts on a rear surface side of the piston, wherein:
  oil holes that supply/discharge oil pressure to/from the hydraulic oil chamber of the other clutch are arranged in the boss portion at positions opposite to the discharge holes in an axial direction with respect to oil supply holes for the cancel oil chamber of the one clutch.

4. The automatic transmission according to claim 3, wherein:
  the hydraulic oil chamber and the cancel oil chamber of the one clutch are arranged on the radially outer side of the hydraulic oil chamber and the cancel oil chamber of the other clutch so as to respectively overlap in the axial direction;
  oil pressure is supplied/discharged to/from the hydraulic oil chamber of the one clutch via an oil passage formed in the clutch drum of the one clutch;
  oil is supplied/discharged to/from the cancel oil chamber of the one clutch via a space between the clutch drum of the one clutch and the clutch drum of the other clutch; and
  the hydraulic oil chamber and the cancel oil chamber of the other clutch are arranged in parallel in the axial direction such that they overlap with a space in a radial direction.

5. The automatic transmission according to claim 4, wherein a radially outer side of a cancel plate that defines the cancel oil chamber of the one clutch is fitted to an inner peripheral surface of the piston of the one clutch in an oil-tight manner, and a radially inner side of the cancel plate is fitted to an outer peripheral surface of the clutch drum of the other clutch in an oil-tight manner.

6. The automatic transmission according to claim 3, wherein:
  the hydraulic oil chamber and the cancel oil chamber of the other clutch are arranged in parallel in the axial direction such that they overlap with the hydraulic oil chamber and the cancel oil chamber of the one clutch in a radial direction; and
  the clutch drum of the other clutch serves as a cancel plate of the one clutch.

7. The automatic transmission according to claim 3, further comprising:
  an input shaft that receives an input rotation from a driving source;
  a speed reduction planetary gear comprising:
    a first sun gear that is non-rotatably fixed to a case and a fixed member formed integrally with the case,
    a first carrier that is connected to the input shaft, and
    a first ring gear that outputs a rotation reduced by the first sun gear non-rotatably fixed and the first carrier that receives the input rotation; and
  a planetary gear set comprising:
    a second sun gear that receives the reduced rotation of the first ring gear when a first clutch is engaged,
    a third sun gear that receives the reduced rotation of the first ring gear when a third clutch is engaged, receives the rotation of the input shaft via the first carrier when a fourth clutch is engaged, and stops the rotation when a first brake is engaged,
    a second carrier that includes a long pinion that meshes with the third sun gear and a short pinion that meshes with the long pinion and the second sun gear, stops the rotation when the second brake is engaged, and receives the rotation of the input shaft when a second clutch is engaged, and
    a second ring gear that meshes with the long pinion, and that is rotatably connected to an output member, wherein:
  the one clutch is the third clutch;
  the other clutch is the fourth clutch;
  when the first clutch is engaged and the second brake is engaged, a first forward speed is selected;
  when the first clutch is engaged and the first brake is engaged, a second forward speed is selected;
  when the first clutch and the third clutch are engaged, a third forward speed is selected;
  when the first clutch and the fourth clutch are engaged, a fourth forward speed is selected;

when the first clutch and the second clutch are engaged, a fifth forward speed is selected;

when the second clutch and the fourth clutch are engaged, a sixth forward speed is selected;

when the second clutch and the third clutch are engaged, a seventh forward speed is selected;

when the second clutch is engaged and the first brake is engaged, an eighth forward speed is selected; and when the third clutch or the fourth clutch is engaged and the second brake is engaged, a reverse speed is selected.

8. The automatic transmission according to claim 4, wherein:

the clutch drum of the one clutch includes an inner peripheral side member and an outer peripheral side member that are integrally structured, with the inner peripheral side member including the boss portion, and the oil pressure is supplied/discharged to/from the hydraulic oil chamber of the one clutch via the oil passage formed between the inner peripheral side member and the outer peripheral side member of the clutch drum of the one clutch.

9. The automatic transmission according to claim 8, wherein the inner peripheral side member includes the boss portion at a radially inner side thereof with oil holes that supplies oil to the cancel oil chamber.

10. The automatic transmission according to claim 9, wherein:

the inner peripheral side member has a plurality of rib-like projections formed thereon, the plurality of rib-like projections being configured so as to project into a gap between the inner peripheral side member and the outer peripheral side member that is used to supply oil to the cancel oil chamber of the one clutch, and a portion of a rear surface of the inner peripheral side member that does not have one of the plurality of rib-like projections is formed to be recessed toward the outer peripheral side member.

* * * * *